Patented Aug. 29, 1939

2,171,389

UNITED STATES PATENT OFFICE 2,171,389

PROCESS OF APPLYING A COATING OF LACQUER TO FLEXIBLE MATERIALS

Steven Jan Blaupot ten Cate, Kootwijk, Netherlands

No Drawing. Application April 13, 1937, Serial No. 136,685. In the Netherlands April 17, 1936

10 Claims. (Cl. 91—68)

The invention relates to a process of applying a coating of lacquer to flexible materials such as textile fabrics, leather, artificial leather, flexible artificial materials made from a fibrous fleece or from leather waste material and a binding agent, leather cloth and the like.

For this purpose use in generally made of cellulose lacquers, rubber lacquers or oil lacquers which are applied to the material which is to receive the coating by means of a spreading machine or a spraying gun.

Some drawbacks, however, are generally connected with the use of the said lacquers; cellulose lacquer will not always sufficiently adhere to the material, while its flexibility is often unsatisfactory. The rubber lacquers, although they are less expensive, have the drawback that they do not present a pleasing appearance, and that they have a limited range of colors and insufficient hardness, whereas the oil lacquers will soon grow sticky and have an unpleasant odor and only a moderate degree of hardness. Moreover, the products of all the lacquering processes hitherto known present no similarity to good natural leather.

According to the present invention it is possible to obviate all the above mentioned drawbacks and to produce an inexpensive lacquer that may be manufactured in a very short time and in any color desired, the said lacquer having extraordinary flexibility, tensile strength and toughness combined with a sufficiently hard surface which— and this is of the highest importance—shows a great similarity to the surface of natural leather. The process according to the invention consists in successively applying to the material one or more priming layers having rubber as a basis, one or more intermediate layers containing both rubber and a film-forming substance miscible with rubber and adapted to adhere to cellulose lacquer, and finally a coating of cellulose lacquer.

The priming coating preferably consists of a self-vulcanizing rubber dispersion with a large proportion of fillers for which pigments in the color of the coating of lacquer to be produced, are preferably used. The rubber guarantees a very good adhesion to the material, whereas the high filler content is needed on the one hand for obtaining a good coating by only a few strokes of the brush, whereby roughness of the surface, uneven shades of coloring and other irregularities of the material are obviated, and on the other hand for imparting a certain microporosity to the layer itself, which microporosity is required for the purpose of securing a good adhesion of the superimposed layers.

Excellent results are obtained e. g. with a proportion of fillers of 250%, calculated on the weight of the rubber. The percentage, however, depends to a substantial degree on the character of the filler used.

If desired it is also possible to use a plurality of priming layers of different compositions. In that case the composition of the lowermost priming layer may be adapted to the nature of the material to be coated by using other fillers or smaller quantities of fillers than in the further priming layers, and also by adding or omitting plastifying agents. For a priming layer to be applied to a closely woven fabric of highly twisted threads for example smaller amounts of fillers will be used than for a priming layer to be applied to a porous fabric or to an artificial material made of unwoven fibres combined with a binding agent, while on a flexible material all the priming layers will have to contain a larger quantity of a plastifying agent than on stiffer material.

On the priming layers described above there are subsequently applied one or more adhesive layers of a material having a composition intermediate between that of the priming layer and that of the subsequent layer of cellulose lacquer, the said adhesive layers consequently constituting a kind of transition between the said layers, whereby a firm adherence is obtained.

For the adhesive layer I generally use a mixture of a rubber dispersion, a solution of a polymerized acrylic acid ester or of a similar artificial resin and an emulsion of a cellulose ether, e. g. the methyl ether.

The adhesive layers may be applied e. g. as follows:

For the first adhesive layer I use a mixture of a 60 per cent rubber dispersion with a 25 per cent aqueous solution of a polymerized acrylic acid ester and a 10 per cent aqueous cellulose ether-emulsion in a proportion of 100 to 200 to 40. This layer will adhere very strongly to the priming layers.

I now apply a second adhesive layer consisting of a mass of a similar composition which, however, contains the three constituents in a ratio of 100 to 575 to 115. This adhesive layer constitutes the transition to the very thin coating of lacquer now following.

The said coating of lacquer consists of a solution of cellulose or cellulose derivatives, e. g. nitrocellulose or acetyl cellulose. This coating will adhere very strongly to the adhesive mass described above.

According to the invention it is possible to obtain a very fine surface by imparting to the lacquer coating or to the last brush strokes of the same so high a content of pigments and, if desired, plastifying agents that a microporous layer is formed which by itself would be unsuitable for a covering layer, and covering the said layer with a coating of wax.

In this process the coating of lacquer may contain a proportion of pigments of e. g. 125-200 per cent calculated on the preferably highly viscous collodium wool and a proportion of plastifying agent of e. g. 165 per cent, depending on the pigment used, which makes that the lacquer with regard to flexibility and elongation will satisfy extremely high requirements. This lacquer, however, on account of its higher pigment content will be porous and not scratch-proof, while it also has a tendency to come off, which makes it completely unsuitable to serve as a final coat. The coat of lacquer may be very thin, so that its thickness only amounts to a few hundredth parts of a millimeter. It will be sufficient to use a thickness such that the color will be sufficiently dense (which will very soon be the case, because of the high pigment content of the lacquer itself, as well as of that of the priming layers) and the coating will have sufficient porosity and thickness for the adhesion of the subsequent very thin coatings of wax.

This coat of wax is applied as the final stroke, and preferably consists of an aqueous emulsion of a mixture emulsified in water, of a soft wax e. g. bees-wax or a similar product with a hard wax having a high melting point, the soft wax serving as a softening agent for the hard wax, while the latter on account of its high melting point and its general stability provides a very good covering and reinforcement for the coat of lacquer underneath the same. Instead of a mixture of a soft wax and a hard wax, it is also possible to use a wax of medium hardness. Since this coating of wax will penetrate more or less into the micro-porous coating of lacquer there will be formed a perfect unit and after polishing the surface will be characterized by a typical leather-like gloss which possesses considerable advantages, particularly for imitation leathers.

After the coating of wax has dried, it may be heated in such a manner that the light color disappears, without the wax being entirely melted.

After the grain has been pressed in, the layer of lacquer and wax which will then be dull, may be polished by rubbing the surface. The raised portions thereby will obtain a higher gloss than the background, which contributes to increase the liveliness of the appearance of the material.

The coat of wax to be applied may be colored, if desired, with the aid of pigments or soluble dyestuffs. The quantity of dyestuff added, however, must not be so large that the color comes off when the lacquered material is being used.

According to the invention the coating of wax is preferably applied on a very thin coating of cellulose lacquer which contains large quantities of pigments and preferably also large quantities of softening agents, which layer is secured to the material by means of one or more priming layers containing rubber as their main constituent and one or more intermediate coats of a material constituting a transition to the lacquer coating.

It is also possible, according to the invention, to apply the coating of wax to a cellulose lacquer coat containing large quantities of pigments and/or softening agents, which cellulose lacquer coat is connected with the material in a different manner. On the other hand it is also possible to cause a normal cellulose lacquer either colored or entirely transparent to adhere very firmly to a material with the aid of the priming layers and intermediate coats described above. In that case the said layer of lacquer will not be microporous, and will be sufficiently hard and adhering, so that it is not provided with a covering coat.

For the application of the wax coating according to the invention a cellulose lacquer coat is particularly appropriate. If desired, the said wax coating may also be applied to some other layer of lacquer, provided this layer has a content of pigment and, contingently, softening agents to render it micro-porous.

The values given above for the composition of the layer are only mentioned by way of example; the substances mentioned may be replaced by other substances possessing similar properties, while the relative proportions may also be modified according to the properties of the product to be obtained.

The present invention possesses great economical advantages, since (a) The greater part of the lacquer coating consists of aqueous emulsions, which means a great saving of solvents, drawing-off and recovering apparatus, less danger of fire and a far more simple method of manufacturing;

(b) The priming layers as well as the cellulose lacquers contain large quantities of fillers which renders them inexpensive;

(c) The most expensive ingredient, i. e. the cellulose lacquer is only used in a very small proportion.

I claim:

1. A process of providing flexible materials with a coating of lacquer comprising applying to the material at least one priming layer containing a large quantity of fillers and rubber as the only binder and at least two intermediate layers consisting of a mixture of a rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, and subsequently applying a coating of cellulose lacquer.

2. A process of applying a coating of lacquer to flexible materials comprising applying to the material at least one priming layer containing a large quantity of fillers and self-vulcanizing rubber dispersion as the only binder and at least two intermediate layers consisting of a mixture of a self vulcanizing rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, and subsequently applying a coating of cellulose lacquer.

3. A process of applying a coating of lacquer to flexible materials comprising applying to the material at least one priming layer containing a self-vulcanizing rubber dispersion as the only binder and a large proportion of fillers, and at least two intermediate layers consisting of a mixture of a self vulcanizing rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, and subsequently applying a coating of cellulose lacquer.

4. A process of applying a coating of lacquer to flexible materials comprising applying to the material at least two priming layers containing a self-vulcanizing rubber dispersion as the only binder and different amounts of fillers and plastifying agents and at least two intermediate layers consisting of a mixture of a self vulcanizing rubber dispersion, a polymerized acrylic acid ester and a cellulose ether emulsion, the first intermediate layer containnig a larger proportion of rubber than the succeeding intermediate layers so as to obtain a firm adherence of the first intermediate layer to the rubber base and of the last intermediate layer to the cellulose lacquer coating, and subsequently applying a coating of cellulose lacquer.

5. A process of providing flexible materials with a coating of lacquer comprising applying to the material at least one priming layer containing a large quantity of fillers and rubber as the only binder and at least two intermediate layers consisting of a mixture of a rubber dispersion, a polymerized acrylic acid ester and a cellulose ether emulsion, the first intermediate layers containing a larger proportion of rubber than the succeeding intermediate layers so as to obtain a firm adherence of the first intermediate layer to the rubber base and of the last intermediate layer to the cellulose lacquer coating, and subsequently applying at least one coating of cellulose lacquer and a coating of wax, the cellulose lacquer coating containing a high proportion of pigments so as to make the same microporous and unsuitable to be used per se as a covering layer.

6. A process of providing flexible materials with a coating of lacquer comprising applying to the material at least one priming layer containing a large quantity of fillers and rubber as the only binder and at least two intermediate layers consisting of a mixture of a rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, applying at least one coating of cellulose lacquer and finally applying a coating of wax, the cellulose lacquer coating containing a high proportion of pigments so as to make the same microporous and unsuitable to be used per se as a covering layer.

7. A process of providing flexible materials with a coating of lacquer comprising applying to the material at least one priming layer containing a large quantity of fillers and rubber as the only binder and at least two intermediate layers consisting of a mixture of a rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, applying at least one coating of cellulose lacquer and finally applying a coating of a mixture of hard and soft wax, the cellulose lacquer coating containing a high proportion of pigments so as to make the same microporous and unsuitable to be used per se as a covering layer 8. A process of providing flexible materials with a coating of lacquer comprising applying to the material at least one priming layer containing a large quantity of fillers and rubber as the only binder and at least two intermediate layers consisting of a mixture of a rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, applying at least one coating of cellulose lacquer and firmly applying a coating of an aqueous wax emulsion, the cellulose lacquer coating containing a high proportion of pigments so as to make the same microporous and unsuitable to be used per se as a covering layer.

9. A process of providing flexible materials with a coating of lacquer comprising applying to the material at least one priming layer containing a large quantity of fillers and rubber as the only binder and at least two intermediate layers consisting of a mixture of a rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, applying at least one coating of cellulose lacquer and finally applying a coating of wax, the cellulose lacquer coating containing a high proportion of pigments and plastifying agents so as to make the same microporous and unsuitable to be used per se as a covering layer 10. A process of providing flexible materials with a coating of lacquer comprising applying to the material at least one priming layer containing a large quantity of fillers and rubber as the only binder and at least two intermediate layers consisting of a mixture of a rubber dispersion, a polymerized acrylic acid ester and a cellulose ether emulsion, the first intermediate layer containing a larger proportion of rubber than the succeeding intermediate layers so as to obtain a firm adherence of the first intermediate layer to the rubber base and of the last intermediate layer to the cellulose lacquer coating, applying at least one coating of cellulose lacquer and finally applying a coating of wax containing dye stuffs, the cellulose lacquer coating containing a high proportion of pigments so as to make the same microporous and unsuitable to be used per se as a covering layer.

STEVEN JAN BLAUPOT TEN CATE.